United States Patent
Niu et al.

(10) Patent No.: US 12,062,256 B2
(45) Date of Patent: Aug. 13, 2024

(54) METHOD AND DEVICE FOR REMOTELY DIAGNOSING VEHICLE FAULTS, VEHICLE, AND COMPUTER STORAGE MEDIUM

(71) Applicants: ZHEJIANG ZEEKR INTELLIGENT TECHNOLOGY CO., LTD., Ningbo (CN); VIRIDI E-MOBILITY TECHNOLOGY (NINGBO) CO., LTD., Ningbo (CN); ZHEJIANG GEELY HOLDING GROUP CO., LTD., Hangzhou (CN)

(72) Inventors: Shangbing Niu, Ningbo (CN); Zhiwei Zhao, Ningbo (CN); Zhe Sun, Ningbo (CN); Ziwei Deng, Ningbo (CN); Chen Lin, Ningbo (CN); Ruitian Zhang, Ningbo (CN); Huan Wang, Ningbo (CN); Yaqi Niu, Ningbo (CN)

(73) Assignees: ZHEJIANG ZEEKR INTELLIGENT TECHNOLOGY CO., LTD., Ningbo (CN); VIRIDI E-MOBILITY TECHNOLOGY (NINGBO) CO., LTD., Ningbo (CN); ZHEJIANG GEELY HOLDING GROUP CO., LTD., Hangzhou (CN)

( * ) Notice: Subject to any disclaimer, the term of this patent is extended or adjusted under 35 U.S.C. 154(b) by 0 days.

(21) Appl. No.: 18/222,046

(22) Filed: Jul. 14, 2023

(65) Prior Publication Data
US 2024/0038002 A1 Feb. 1, 2024

(30) Foreign Application Priority Data
Jul. 27, 2022 (CN) .......................... 202210895558.5

(51) Int. Cl.
G07C 5/08 (2006.01)
G06Q 10/20 (2023.01)
G07C 5/00 (2006.01)

(52) U.S. Cl.
CPC .......... G07C 5/0808 (2013.01); G06Q 10/20 (2013.01); G07C 5/008 (2013.01)

(58) Field of Classification Search
CPC .... G07C 5/0808; G07C 5/008; G07C 5/0841; G06Q 10/20; G05B 23/0213; Y02P 90/02; H04L 67/50
See application file for complete search history.

(56) References Cited

U.S. PATENT DOCUMENTS

| | | | |
|---|---|---|---|
| 9,418,493 B1* | 8/2016 | Dong | ................. G05B 23/0221 |
| 2015/0094903 A1* | 4/2015 | Bell | .................... G07C 5/0808 |
| | | | 701/1 |
| 2020/0043256 A1 | 2/2020 | Rocci et al. | |

FOREIGN PATENT DOCUMENTS

| | | |
|---|---|---|
| CN | 113448320 A | 9/2021 |
| JP | 2010-032431 A | 2/2010 |
| JP | 2021-096149 A | 6/2021 |

OTHER PUBLICATIONS

Notice of Reasons for Refusal issued in corresponding Japanese Application No. 2023-115204, mailed Dec. 19, 2020, 4 pages.

(Continued)

*Primary Examiner* — Michael V Kerrigan
(74) *Attorney, Agent, or Firm* — BAYES PLLC

(57) ABSTRACT

Disclosed herein are a method and a device for remotely diagnosing vehicle faults, a vehicle and a computer storage medium. The method includes monitoring vehicle data uploaded by the vehicle in real time via a cloud platform, and determining whether to identify a preset fault abnormal signal identification from target data of the vehicle data. The method also includes, in response to the fault abnormal (Continued)

signal identification being identified from the target data, sending a fault diagnosis task to the vehicle according to the target data, and receiving diagnosis result data returned by the vehicle after the fault diagnosis task is executed locally by the vehicle. The method further includes generating a remote fault diagnosis result of the vehicle according to the vehicle data and the diagnosis result data.

20 Claims, 6 Drawing Sheets

(56) References Cited

OTHER PUBLICATIONS

Extended European Search Report issued in corresponding in European Application No. 23186080.0, mailed on Dec. 13, 2023, 9 pages.

* cited by examiner

METHOD AND DEVICE FOR REMOTELY DIAGNOSING VEHICLE FAULTS, VEHICLE, AND COMPUTER STORAGE MEDIUM

CROSS-REFERENCE TO RELATED APPLICATIONS

This application claims the benefit of priority to Chinese Patent Application No. 202210895558.5, filed on Jul. 27, 2022, the entire contents of which are incorporated herein by reference.

TECHNICAL FIELD

The present application relates to the technical field of vehicles, and in particular to a method and a device for remotely diagnosing vehicle faults, a vehicle, and a computer storage medium.

BACKGROUND

At present, vehicle diagnosis and maintenance are usually performed on-site when the new energy vehicle fails, and the specific practices are as follows: when the user finds that the vehicle fails, he will inform the car service provider of the vehicle faults by phone or online, then the car service provider or the user will arrange a tow truck, or the user will drive the vehicle to the after-sales maintenance shop, and the after-sales maintenance personnel will check the vehicle on site to determine the failure cause, and will repair or replace the components. However, this method of performing vehicle diagnosis and maintenance for vehicle faults on-site usually takes several days, and the whole process takes a long time and has relatively high labor costs.

To sum up, the current methods of performing vehicle diagnosis and maintenance for vehicle faults on site have a long maintenance cycle and high labor costs.

SUMMARY

The main purpose of the present application is to provide a method and a device for remotely diagnosing vehicle faults, a vehicle and a computer storage medium, aiming to perform diagnosis and auxiliary after-sales maintenance for the vehicle faults quickly based on remote diagnosis services, thereby solving the problems of long maintenance cycles and high labor costs caused by performing vehicle diagnosis and maintenance on site.

In order to solve the above objectives, the present application provides a method for remotely diagnosing vehicle faults applied to a cloud platform, and the cloud platform communicates with a vehicle. The method for remotely diagnosing vehicle faults includes monitoring vehicle data uploaded by the vehicle in real time, and determining whether to identify a preset fault abnormal signal identification from target data of the vehicle data; in response to that the fault abnormal signal identification is identified from the target data, sending a fault diagnosis task to the vehicle according to the target data; and receiving diagnosis result data returned by the vehicle after the fault diagnosis task is executed locally by the vehicle, and generating a remote fault diagnosis result of the vehicle according to the vehicle data and the diagnosis result data.

In an embodiment, the cloud platform further communicates with an after-sales system of the vehicle; and after the generating the remote fault diagnosis result of the vehicle according to the vehicle data and the diagnosis result data, the method for remotely diagnosing vehicle faults further includes sending the remote fault diagnosis result to the after-sales system, to allow the after-sales system to prepare a maintenance service for the vehicle according to the remote fault diagnosis result.

In an embodiment, the cloud platform includes a first cloud database and a second cloud database; and the method for remotely diagnosing vehicle faults further includes storing the vehicle data uploaded by the vehicle in real time in the first cloud database; and storing the target data in the second cloud database in response to determining that the fault abnormal signal identification is identified from the target data.

In an embodiment, the sending the fault diagnosis task to the vehicle according to the target data includes determining vehicle-related information related to fault abnormal signal data according to the target data stored in the second cloud database; generating a fault diagnosis task for the target vehicle; and sending the fault diagnosis task to the target vehicle according to the vehicle-related information.

In an embodiment, the generating the remote fault diagnosis result of the vehicle according to the vehicle data and the diagnosis result data includes reading the target vehicle data of the target vehicle from the vehicle data stored in the first cloud database; and generating the remote fault diagnosis result of the vehicle according to the target vehicle data and the diagnosis result data.

Further, in order to solve the above objectives, the present application provides a method for remotely diagnosing vehicle faults applied to a vehicle, the vehicle communicates with a cloud platform, and the method for remotely diagnosing vehicle faults includes receiving a fault diagnosis task sent from the cloud platform; calling one or more preset vehicle controllers to execute the fault diagnosis task to obtain diagnosis result data; and returning the diagnosis result data to the cloud platform to allow the cloud platform to generate a remote fault diagnosis result of the vehicle according to the diagnosis result data and the vehicle data pre-stored in the cloud platform.

In an embodiment, the calling one or more preset vehicle controllers to execute the fault diagnosis task to obtain diagnosis result data includes analyzing the fault diagnosis task, and sending the fault diagnosis task to one or more corresponding vehicle controllers through a vehicle network; receiving result data returned by one or more vehicle controllers through the vehicle network, the result data is generated when the one or more vehicle controllers respond to the fault diagnosis task; and packaging the result data to obtain the diagnosis result data corresponding to the fault diagnosis task.

Further, in order to solve the above objectives, the present application provides a device for remotely diagnosing vehicle faults applied to a cloud platform, the cloud platform communicates with a vehicle; the device for remotely diagnosing vehicle faults includes a real-time monitoring module, configured to monitor vehicle data uploaded by the vehicle in real time and determine whether to identify a preset fault abnormal signal identification from target data of the vehicle data; a task sending module, configured to send a fault diagnosis task to the vehicle according to the target data in response to determining that the fault abnormal signal identification is identified from the target data; and a diagnosis result confirmation module, configured to receive diagnosis result data returned by the vehicle after the fault diagnosis task is executed locally by the vehicle and generate a remote fault diagnosis result of the vehicle according to the vehicle data and the diagnosis result data; and the device for remotely diagnosing vehicle faults is further applied to the vehicle, and the device for remotely diagnosing vehicle faults further includes a task receiving module, configured to receive the fault diagnosis task sent from the cloud platform; a task response module, configured to call one or more preset vehicle controllers to execute the fault diagnosis task to obtain diagnosis result data; and a result feedback module, configured to return the diagnosis result data to the cloud platform, to allow the cloud platform to generate a remote fault diagnosis result of the vehicle according to the diagnosis result data and the vehicle data pre-stored in the cloud platform.

Each functional module of the device for remotely diagnosing vehicle faults can implement the method for remotely diagnosing vehicle faults as mentioned above when operating.

Further, in order to solve the above objectives, the present application provides a vehicle including: a memory; a processor; and a program for implementing a method for remotely diagnosing vehicle faults stored in the memory. The program for implementing the method for remotely diagnosing vehicle faults is executed by a processor to implement the method for remotely diagnosing vehicle faults as mentioned above.

The present application further provides a computer storage medium. A program for implementing a method for remotely diagnosing vehicle faults as mentioned above is stored in the computer storage medium and is executed by a processor to implement the method for remotely diagnosing vehicle faults as mentioned above.

Further, in order to solve the above objectives, the present application provides a computer program product including a computer program. When the computer program is executed by a processor, the method for remotely diagnosing vehicle faults as mentioned above is implemented.

The present disclosure provides a method and a device for remotely diagnosing vehicle faults, a vehicle and a computer storage medium. The method includes: monitoring vehicle data uploaded by the vehicle in real time via the cloud platform, and determining whether to identify a preset fault abnormal signal identification from target data of the vehicle data; in response to that the fault abnormal signal identification is identified from the target data, sending a fault diagnosis task to the vehicle according to the target data; and receiving diagnosis result data returned by the vehicle after the fault diagnosis task is executed locally by the vehicle, and generating a remote fault diagnosis result of the vehicle according to the vehicle data and the diagnosis result data.

Therefore, in the present application, the vehicle data uploaded to the cloud platform by the vehicle is monitored in real time, and the diagnosis task will be remotely sent to the corresponding vehicle when the fault abnormal signal identification is identified, so that the vehicle can be diagnosed locally. Finally, the cloud platform will generate the final remote fault diagnosis result of the vehicle according to the vehicle data uploaded by the vehicle and the local diagnosis result data. In this way, based on the remote diagnosis service, diagnosis for the vehicle faults can be performed quickly in the technical solution of the present application, which does not require that the vehicle must be detected and diagnosed at the maintenance point by the maintenance personnel on site after the vehicle fails, thereby effectively shortening the time for diagnosing vehicle faults and saving labor costs.

Furthermore, in the technical solution of this application, the cloud platform can further directly communicate with the after-sales system of the vehicle, so that the fault diagnosis results obtained by remote diagnosis can be sent to the after-sales system to assist the after-sales maintenance of the vehicle. In this way, the user experience for the vehicle can be improved to a great extent.

BRIEF DESCRIPTION OF THE DRAWINGS

The accompanying drawings, which are incorporated in and constitute a part of the description, illustrate embodiments consistent with the present application and explain the principles of the present application together with the description.

To more clearly illustrate technical solutions in the embodiments or the existing technologies, the following will briefly introduce the drawings that need to be used in the description of the embodiments or the existing technologies. Obviously, for those skilled in the art, without creative effort, other drawings can be obtained according to these drawings.

Figure 1:
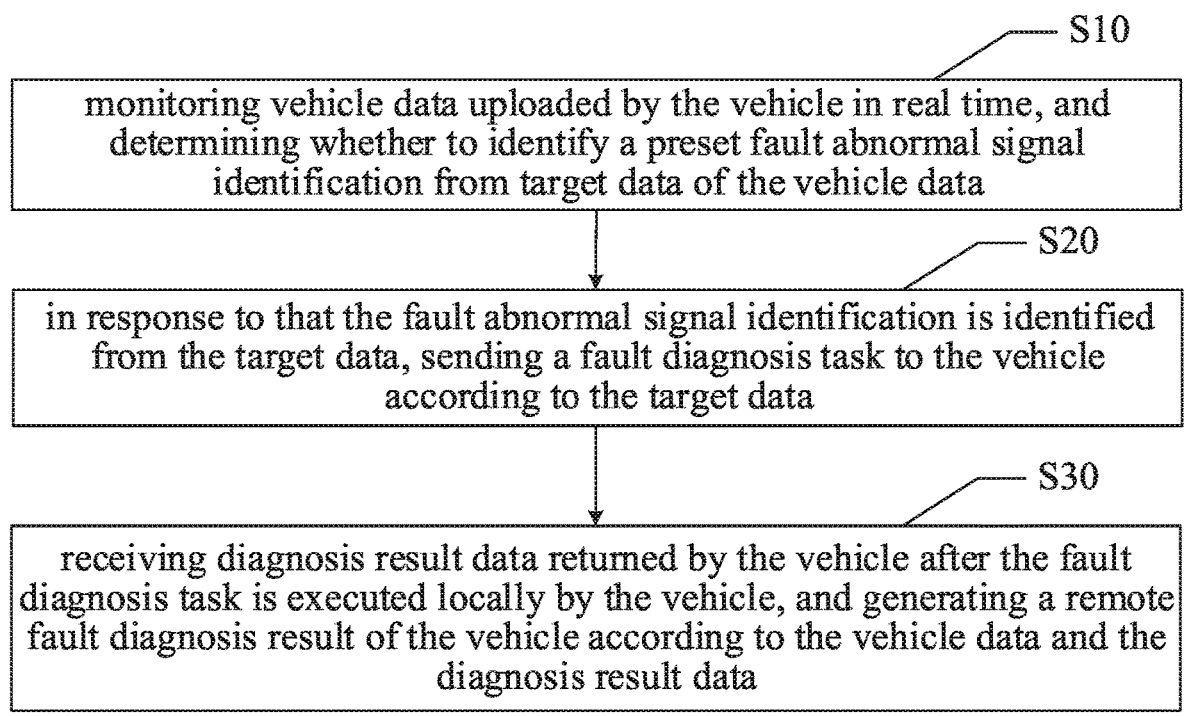
FIG. 1 is a schematic flowchart of a method for remotely diagnosing vehicle faults according to a first embodiment of the present application.

The realization of the objective, functional characteristics, and advantages of the present application are further described with reference to the accompanying drawings.

DETAILED DESCRIPTION

It should be understood that the specific embodiments described here are only for explaining the present application, and are not intended to limit the present application.

It should be noted that, in this embodiment, at present, vehicle diagnosis and maintenance are usually performed on site when the new energy vehicle fails, and the specific practices are as follows: when the user finds that the vehicle fails, he will inform the car service provider of the vehicle faults by phone or online, then the car service provider or the user will arrange a tow truck, or the user will drive the vehicle to the after-sales maintenance shop, and the after-sales maintenance personnel will check the vehicle on site to determine the failure cause, and will repair or replace the components. However, this method of performing vehicle diagnosis and maintenance for vehicle faults on site usually takes several days, and the whole process takes a long time and has relatively high labor costs.

To sum up, the current methods of performing vehicle diagnosis and maintenance for vehicle faults on site have a long maintenance cycle and high labor costs.

In view of the above phenomenon, embodiments of the present application provide a method for remotely diagnosing vehicle faults. In an embodiment of the present application, the method for remotely diagnosing vehicle faults includes: monitoring the vehicle data uploaded by the vehicle in real time via a cloud platform, and determining whether to identify a preset fault abnormal signal identification from target data of the vehicle data; determining whether to identify a preset fault abnormal signal identification from target data of the vehicle data; in response to that the fault abnormal signal identification is identified from the target data, sending a fault diagnosis task to the vehicle according to the target data; and receiving diagnosis result data returned by the vehicle after the fault diagnosis task is executed locally by the vehicle, and generating a remote fault diagnosis result of the vehicle according to the vehicle data and the diagnosis result data.

That is to say, in the present application, the vehicle data uploaded to the cloud platform by the vehicle will be monitored in real time, and the diagnosis task will be remotely sent to the corresponding vehicle when the fault abnormal signal identification is identified, so that the vehicle can be diagnosed locally. Finally, the cloud platform will generate the final remote fault diagnosis result of the vehicle according to the vehicle data uploaded by the vehicle and the local diagnosis result data. In this way, based on the remote diagnosis service, diagnosis for the vehicle faults can be performed quickly in the technical solution of the present application, which does not require that the vehicle must be detected and diagnosed at the maintenance point by the maintenance personnel on site after the vehicle fails, thereby effectively shortening the time for diagnosing vehicle faults and saving labor costs.

Furthermore, in the technical solution of this application, the cloud platform can further directly communicate with the after-sales system of the vehicle, so that the fault diagnosis results obtained by remote diagnosis can be sent to the after-sales system to assist the after-sales maintenance of the vehicle. In this way, the user experience for the vehicle can be improved to a great extent.

Based on the overall idea of the method for remotely diagnosing vehicle faults of the present application, a first embodiment of the method for remotely diagnosing vehicle faults of the present application is proposed. As shown in FIG. 1, FIG. 1 is a schematic flowchart of the method for remotely diagnosing vehicle faults according to a first embodiment of the present application. It should be noted that although logical orders are shown in the flowchart, in some cases, the operations shown or described herein may be performed in different orders.

Figure 2:
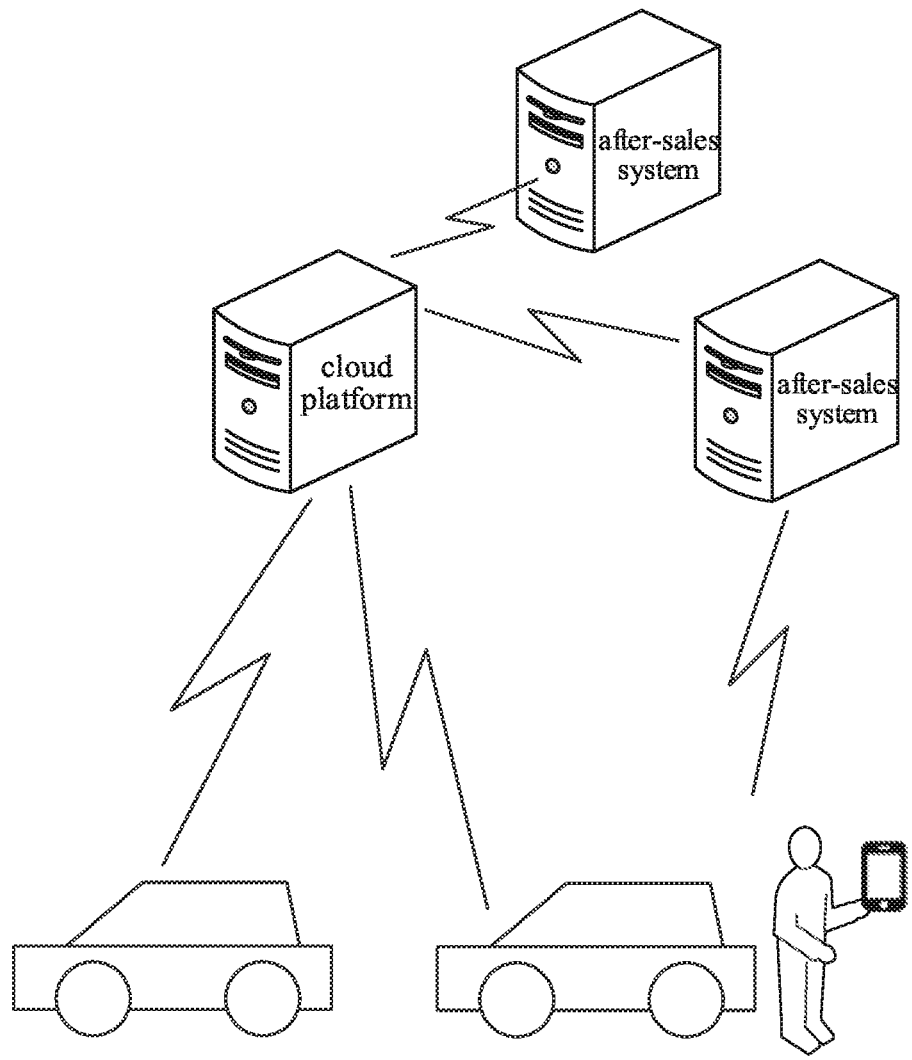
FIG. 2 is a schematic diagram of an interaction scenario between a cloud platform, a vehicle and an after-sales system in the method for remotely diagnosing vehicle faults according to an embodiment of the present application.

In addition, in this embodiment, the execution subject of the method for remotely diagnosing vehicle faults of the present application may be the cloud platform. In the scenario shown in FIG. 2, the cloud platform for remotely diagnosing vehicle faults can communicate with one vehicle, or can communicate with a plurality of vehicles simultaneously, so that the vehicle can upload the vehicle data generated during the actual operation process to the cloud platform in real time through the communication. Based on the vehicle data, the cloud platform can read, monitor and analyze the vehicle data in real time for remotely diagnosing faults. In addition, the cloud platform can also communicate with the after-sales system of the vehicle, so that after the cloud platform performs remote fault diagnosis on the vehicle to determine the fault diagnosis result of the vehicle, the diagnosis result can be directly sent to the corresponding after-sales system. Furthermore, the after-sales system can directly make corresponding fault maintenance preparations for the vehicle in advance based on the fault diagnosis result.

As shown in FIG. 1, in the first embodiment of the method for remotely diagnosing vehicle faults of the present application, the method for remotely diagnosing vehicle faults of the present application specifically includes the following operations.

Operation S10, monitoring vehicle data uploaded by the vehicle in real time, and determining whether to identify a preset fault abnormal signal identification from target data of the vehicle data.

In this embodiment, one or more vehicles communicate with the cloud platform in advance, and during the process of the one or more vehicles uploading the generated vehicle data in real time, the cloud platform will read and monitor the vehicle data in real time, to determine whether to identify a preset fault abnormal information identification from one or more pieces of target data in the full amount of vehicle data.

It should be noted that in this embodiment, the vehicle can upload the vehicle data continuously generated during the operation process to the cloud platform through the wireless transmission module configured in the vehicle. The cloud platform can specifically be the enterprise cloud platform built by the enterprise. The cloud platform can also be the mature commercial platform such as Kangaroo Cloud, Alibaba Cloud, Huawei Cloud, and the like.

In addition, in this embodiment, the fault abnormal information identification refers to the identification data after the value of the fault abnormal signal data is changed when a vehicle that has been defined in the vehicle terminal fails. Based on this, the cloud platform can identify the identification data to determine that the vehicle fails at this time. For example, in the vehicle data uploaded by the vehicle which can be set in advance, the value of the fault abnormal signal data can be preset as 0 under normal circumstances, and when the vehicle is abnormal, the value of the fault signal data is changed to 1, and the data value "1" is the fault abnormal information identification used for prompting the cloud platform that the vehicle fails.

Operation S20, in response to the fault abnormal signal identification is identified from the target data, sending a fault diagnosis task to the vehicle according to the target data.

In this embodiment, when the cloud platform identifies the preset fault abnormal information identification from one or more pieces of target data in the total amount of vehicle data, it can be determined that the target vehicle which uploads the one or more pieces of target data has already failed, so that the cloud platform can further send a fault diagnosis task to the target vehicle according to the vehicle-related information of the target vehicle in the target data.

It should be noted that, in this embodiment, the vehicle-related information of the target vehicle in the target data refers to the vehicle VIN (road vehicle-vehicle identification number) number related to the fault abnormal information identification, the data upload time, the name and the data value of the fault signal data to which the fault abnormal information identification belongs, and the like. In addition, the cloud platform only starts the own remote diagnosis function to send a fault diagnosis task to the corresponding vehicle when the cloud platform identifies the above-mentioned abnormal signal identification.

Operation S30, receiving diagnosis result data returned by the vehicle after the fault diagnosis task is executed locally by the vehicle, and generating a remote fault diagnosis result of the vehicle according to the vehicle data and the diagnosis result data.

In this embodiment, after the cloud platform sends the fault diagnosis task to the corresponding target vehicle, the target vehicle will respond to the fault diagnosis task through the own vehicle controller, to obtain the corresponding diagnosis result data, and then, the target vehicle further returns the diagnosis result data to the cloud platform. Further, after receiving the diagnosis result data, the cloud platform will extract the target vehicle data uploaded by the target vehicle from the full amount of vehicle data received in advance. Then a comprehensive fault analysis will be performed according to the target vehicle data and the diagnosis result data, to generate a remote fault diagnosis result of the target vehicle.

Figure 3:
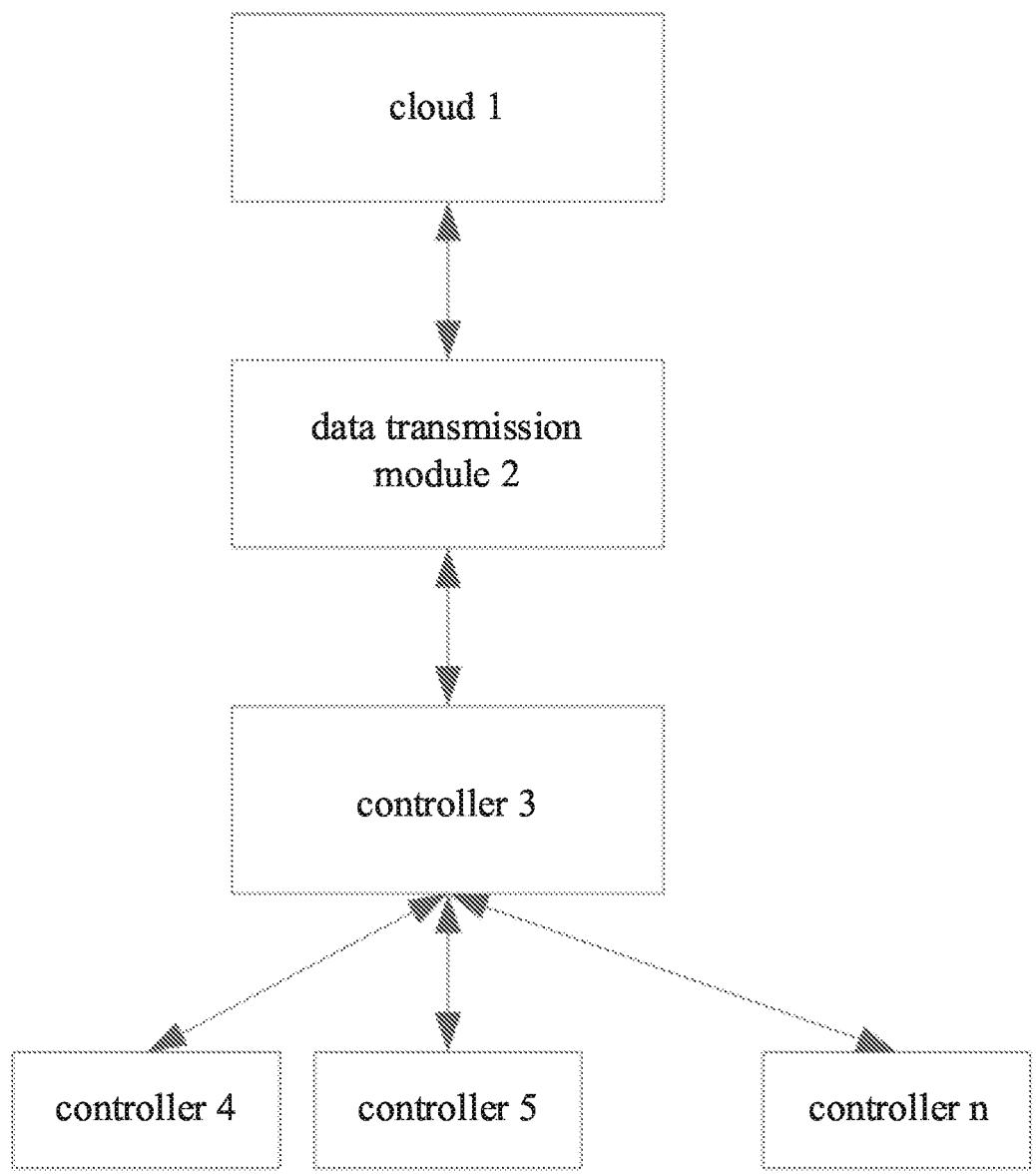
FIG. 3 is a schematic diagram of a remote fault diagnosis principle in the method for remotely diagnosing vehicle faults according to an embodiment of the present application.

As shown in FIG. 3, the cloud platform (illustrated as "cloud 1") will use Flink (an open source stream processing framework developed by the Apache Software Foundation, whose core is a distributed stream data flow engine written in Java and Scala) technology to read the vehicle data uploaded by the vehicle through the remote data transmission module 2 (TBOX) in real time, and will monitor the fault abnormal signal data in the data stream in real time. Once the fault abnormal information identification is identified after the value of the fault abnormal signal data has changed, it means that the vehicle has failed. Therefore, the cloud platform immediately starts the remote diagnosis function to package the diagnosis service instructions into task data packets in the cloud, and sends the task data packet to the vehicle through the wireless network according to the vehicle VIN related to the fault abnormal signal data, the data upload time, the name and the value of the fault signal data. The vehicle receives the task data packet through the remote data transmission module 2, and transmits the task data packet to the corresponding controller 3 for task analysis.

The controller 3 will analyze the task into a diagnosis service instruction, and will send it to the corresponding controller 4 for responding to the execution (if the task involves a plurality of controllers, the controller 3 will send the analyzed diagnosis service instruction to a plurality of corresponding controllers n for responding to the execution. After responding to the diagnosis service instruction, the controller 4-n will return the feedback data to the controller 3. After receiving the data returned by the controller 4-n, the controller 3 further packages all data to the returning data packet. Then, the returning data packet is transmitted to the remote data transmission module 2 as the diagnosis result data, and the remote data transmission module 2 further uploads it to the cloud platform.

Finally, after receiving the returning data packet, the cloud platform can analyze the returning data packet and determines the vehicle fault through the data uploaded by the vehicle before the diagnosis kernel association, and give relevant suggestions and solutions.

Further, in this embodiment, after the generating the remote fault diagnosis result of the vehicle according to the vehicle data and the diagnosis result data, the method for remotely diagnosing vehicle faults further includes sending the remote fault diagnosis result to the after-sales system, to allow the after-sales system to prepare a maintenance service for the vehicle according to the remote fault diagnosis result.

In this embodiment, after generating the remote fault diagnosis result of the failed target vehicle, the cloud platform will further send the remote fault diagnosis result to the after-sales system through the communication connection between the cloud platform and the after-sales system corresponding to the target vehicle. Therefore, the after-sales system can make corresponding maintenance service preparations for the target vehicle according to the remote fault diagnosis results. In this way, after the target vehicle arrives at the maintenance point designated by the after-sales system as scheduled, the maintenance personnel can perform vehicle maintenance quickly based on the previous preparations.

As a feasible implementation, after receiving the remote fault diagnosis result of the target vehicle sent by the cloud platform, the after-sales system can also match the vehicle owner's information, to take the initiative to book the vehicle and enter the station, and can prepare spare parts for the target vehicle through the spare part system.

In the method for remotely diagnosing vehicle faults of this embodiment, one or more vehicles communicate with the cloud platform in advance, and during the process of the vehicle uploading the generated vehicle data in real time, the cloud platform will read and monitor the vehicle data in real time, to determine whether to identify a preset fault abnormal information identification from one or more pieces of target data among the full amount of vehicle data. When the preset fault abnormal information identification is identified by the cloud platform from one or more pieces of target data among the full amount of vehicle data, it can be determined that the target vehicle uploading one or more pieces of target data has failed. Therefore, the cloud platform will further send a fault diagnosis task to the target vehicle according to the vehicle-related information of the target vehicle in the target data. After the cloud platform sends the fault diagnosis task to the corresponding target vehicle, the target vehicle responds to the fault diagnosis task through the vehicle controller, to obtain the corresponding diagnosis result data. Then the target vehicle will return the diagnosis result data to the cloud platform. After receiving the diagnosis result data, the cloud platform further extracts the target vehicle data uploaded by the target vehicle from the pre-received full amount of vehicle data, and then performs the comprehensive fault analysis according to the target vehicle data and the diagnosis result data, to generate the remote fault diagnosis result of the target vehicle.

In this way, the vehicle data uploaded to the cloud platform by the vehicle is monitored in real time, and a diagnosis task will be sent remotely to the corresponding vehicle when the fault abnormal signal identification is identified, so that the vehicle can be diagnosed locally. Finally, the cloud platform will generate the final remote fault diagnosis result of the vehicle according to the vehicle data uploaded by the vehicle and the local diagnosis result data. In this way, based on the remote diagnosis service, diagnosis for the vehicle faults can be performed quickly in the technical solution of the present application, which does not require that the vehicle must be detected and diagnosed at the maintenance point by the maintenance personnel on site after the vehicle fails, thereby effectively shortening the time for diagnosing vehicle faults and saving labor costs.

In addition, in the technical solution of this application, the cloud platform can further communicate with an after-sales system of the vehicle, so that the fault diagnosis results obtained by remote diagnosis can be provided to the after-sales system to assist the after-sales maintenance of the vehicle, thereby improving the user experience for the vehicle to a great extent.

Further, based on the first embodiment of the method for remotely diagnosing vehicle faults of the present application, a second embodiment of the method for remotely diagnosing vehicle faults of the present application is proposed.

In this embodiment, the above-mentioned cloud platform includes a first cloud database and a second cloud database, and the method for remotely diagnosing vehicle faults of the present application may also include storing the vehicle data uploaded by the vehicle in real time in the first cloud database; and storing the target data in the second cloud database in response to determining that the fault abnormal signal identification is identified from the target data.

In this embodiment, by establishing the first cloud database locally, the cloud platform stores the vehicle data uploaded by one or more vehicles in real time, and the one or more vehicles communicate with the cloud platform. The vehicle data stored in the first cloud database is used for subsequent data query of the cloud platform, to generate remote fault diagnosis results of the failed target vehicle.

Moreover, by establishing the second cloud database locally, the cloud platform also stores the monitored and identified target data. That is, when the cloud platform identifies the fault abnormal signal identification, the vehicle VIN of the target vehicle related to the fault abnormal signal data which the identification belongs to, the data upload time, the name and data value of the abnormal signal data are stored in the second cloud database, so that the user subsequent cloud platform can send fault diagnosis task to the target vehicle by reading the vehicle-related information in the second cloud database.

Figure 4:
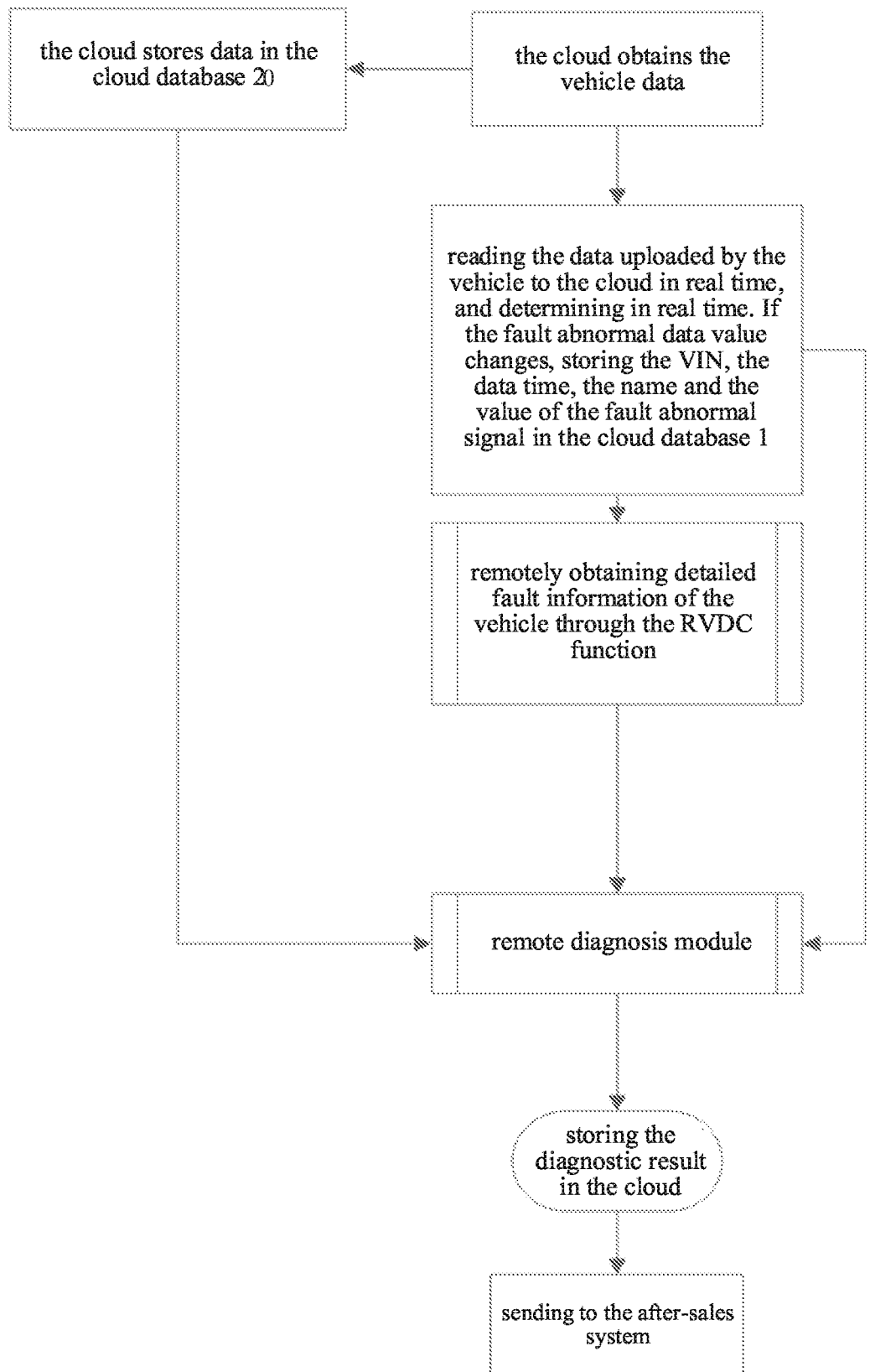
FIG. 4 is a schematic diagram of an application process in the method for remotely diagnosing vehicle faults according to an embodiment of the present application.

As shown in the application process of FIG. 4, after the cloud acquires the vehicle data, the data is stored in a cloud database 20 which is pre-established locally, so that the remote diagnosis module can extract vehicle data from the cloud database 20 for fault diagnosis analysis. In addition, the cloud reads the data uploaded by the vehicle and makes determinations in real time, to store the vehicle VIN, the data upload time, the name and the data value of the abnormal signal in the cloud database 20, which is pre-established locally when a change in the fault abnormal data value is identified. After that, the cloud platform uses the remote vehicle data collection (RVDC) function to obtain the detailed fault information of the target vehicle from the failed target vehicle in the form of asynchronous transmission query response command interaction. Furthermore, based on the detailed fault information and the vehicle data uploaded by the target vehicle and extracted from the cloud database 20, the cloud can use the local remote diagnosis module to perform fault analysis to generate a fault diagnosis result. Finally, the cloud stores the diagnosis result locally and further sends the diagnosis result to the pre-connected after-sales system corresponding to the target vehicle.

Further, the above-mentioned operation of sending the fault diagnosis task to the vehicle according to the target data includes determining vehicle-related information related to fault abnormal signal data according to the target data stored in the second cloud database; generating a fault diagnosis task for the target vehicle; and sending the fault diagnosis task to the target vehicle according to the vehicle-related information.

In this embodiment, the cloud platform identifies the fault abnormal signal identification from the target data in the full amount of vehicle data, and stores the target data in the above-mentioned second cloud database. After that, the cloud platform further uses its remote diagnosis module to extract the vehicle-related information related to the fault abnormal signal data from the target data stored in the second cloud database. When it is determined that the failed vehicle supports the unified diagnostic services (UDS) function, the cloud platform will immediately package and generate a fault diagnosis task for the target vehicle based on the UDS service instruction rules and the related information added during wireless transmission. Then the cloud platform can send the generated fault diagnosis task to the target vehicle according to the vehicle-related information.

Further, in a feasible embodiment, the above-mentioned operation of generating the remote fault diagnosis result of the vehicle according to the vehicle data and the diagnosis result data includes reading the target vehicle data of the target vehicle from the vehicle data stored in the first cloud database; and generating the remote fault diagnosis result of the vehicle according to the target vehicle data and the diagnosis result data.

In this embodiment, the target vehicle calls one or more vehicle controllers to respond to and execute the above-mentioned fault diagnosis task, and the cloud platform receives the diagnosis result data. After that, the cloud platform further uses its remote diagnosis module to read the target vehicle data uploaded by the target vehicle from the full amount of vehicle data, which is uploaded by one or more above-mentioned vehicles. Then the remote diagnosis module performs a comprehensive fault analysis based on the target vehicle data and the diagnosis result data returned by the target vehicle data, to generate the final remote fault diagnosis result of the target vehicle.

Further, based on the first embodiment and/or the second embodiment of the method for remotely diagnosing vehicle faults of the present application, a third embodiment of the method for remotely diagnosing vehicle faults of the present application is proposed.

In this embodiment, the method for remotely diagnosing vehicle faults of the present application is applied to the vehicle communicating with the above-mentioned cloud platform, and the method for remotely diagnosing vehicle faults of the present application may include receiving a fault diagnosis task sent from the cloud platform; calling one or more preset vehicle controllers to execute the fault diagnosis task to obtain diagnosis result data; and returning the diagnosis result data to the cloud platform to allow the cloud platform to generate a remote fault diagnosis result of the vehicle according to the diagnosis result data and the vehicle data pre-stored in the cloud platform.

In this embodiment, during the process of uploading the vehicle data generated by the vehicle to the cloud platform in real time, if the cloud platform monitors the vehicle data in real time and sends a fault diagnosis task to the vehicle, the vehicle will call one or more vehicle controllers to respond to and execute the fault diagnosis task immediately after receiving the fault diagnosis task, to obtain the corresponding diagnosis result data. Then the vehicle will further return the diagnosis result data to the cloud platform. The cloud platform can receive the diagnosis result data, and can further extract the target vehicle data uploaded by the target vehicle from the pre-received full amount of vehicle data. After that, the comprehensive fault analysis will be performed based on the target vehicle data and the diagnosis result data, to generate the remote fault diagnosis results of the target vehicle.

It should be noted that, in this embodiment, the fault diagnosis task may specifically be the diagnosis task for one vehicle controller in the vehicle that complies with the UDS specification, or the fault diagnosis task may specifically be the diagnosis task for a plurality of vehicle controllers comply with the UDS specification. Based on this, the above-mentioned operation of calling one or more preset vehicle controllers to execute the fault diagnosis task to obtain diagnosis result data includes analyzing the fault diagnosis task, and sending the fault diagnosis task to one or more corresponding vehicle controllers through a vehicle network; receiving result data returned by one or more vehicle controllers through the vehicle network, and the result data is generated when the one or more vehicle controllers respond to the fault diagnosis task; and packaging the result data to obtain the diagnosis result data corresponding to the fault diagnosis task.

In this embodiment, after receiving the fault diagnosis task sent by the cloud platform, the vehicle analyzes the fault diagnosis task through its analysis task module, to determine the diagnosis task for a vehicle controller in the vehicle, or analyze and determine the diagnosis tasks for a plurality of vehicle controllers in the vehicle. If the analysis task module only analyzes and determines the diagnosis task for one vehicle controller, the diagnosis task will be sent immediately to the vehicle controller for responding and executing to generate result data. Or, if the analysis task module analyzes and determines the diagnosis tasks for a plurality of vehicle controllers, the analysis task module sends the diagnosis tasks to the corresponding vehicle controllers respectively, so that the plurality of vehicle controllers will respond and execute to generate corresponding result data respectively.

Figure 5:
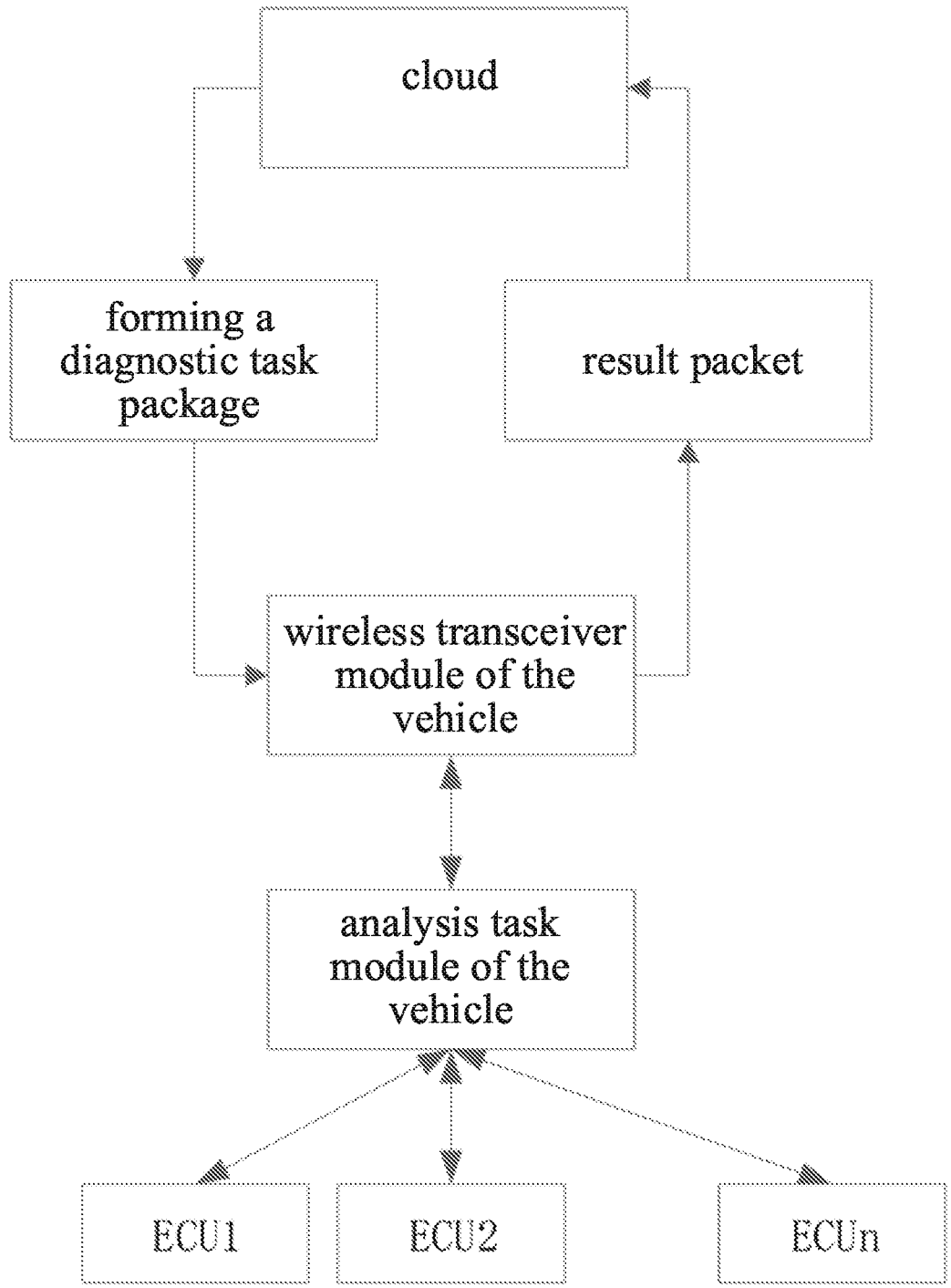
FIG. 5 is a schematic diagram of an application process in the method for remotely diagnosing vehicle faults according to another embodiment of the present application.

As shown in the application process of FIG. 5, after the cloud uses the UDS function supported by the vehicle to package and form the fault diagnosis task according to the UDS service instruction rules and the related information added during wireless transmission, the cloud further transmits the fault diagnosis task to the wireless transceiver module (TBOX) of the vehicle based on the wireless network that communicates the cloud with the vehicle. In this way, after the vehicle receives the fault diagnosis task, the wireless transceiver module is used as the analysis task module to analyze the fault diagnosis task immediately. Or the wireless transceiver module sends the received fault diagnosis task to the analysis task module specially configured in the vehicle through the vehicle network (CAN, Ethernet or other types of communication methods), so that the analysis task module can analyze the fault diagnosis task.

The analysis task module analyzes the fault analysis task according to the data package rules of the UDS functions supported by the vehicle, to analyze out the diagnosis tasks that meet the UDS specification for one or more vehicle controllers (illustrated as "ECU" in the figure), then the analysis task module sends the diagnosis task to the corresponding ECU through the above-mentioned vehicle network.

After receiving the diagnosis task, the ECU will respond to the diagnosis task instruction immediately, and will return the result data generated when the ECU responds to the diagnosis task to the analysis task module through the vehicle network. After collecting the result data generated by all ECUs, the analysis task module packages all result data to form diagnosis result data package.

Finally, the analysis task module sends the diagnosis result data packet generated by the diagnosis to the wireless transceiver module through the vehicle network, so that the wireless transceiver module uploads the diagnosis result data packet to the cloud through the wireless network which communicates the wireless transceiver module with the cloud.

As the method for remotely diagnosing vehicle faults of this embodiment, during the process of the vehicle uploading the vehicle data generated by itself to the cloud platform in real time, if the cloud platform monitors the vehicle data in real time and sends a fault diagnosis task to the vehicle, the vehicle will call one or more of vehicle controllers to respond and execute the fault diagnosis task immediately after receiving the fault diagnosis task, to obtain the corresponding diagnosis result data. Then the vehicle will further return the diagnosis result data to the cloud platform. Furthermore, the cloud platform can receive the diagnosis result data, and will further extract the target vehicle data uploaded by the target vehicle from the pre-received full amount of vehicle data. In this case, the comprehensive fault analysis can be performed according to the target vehicle data and the diagnosis result data, to generate remote fault diagnosis results of the target vehicle.

In this way, based on the remote diagnosis service, diagnosis for the vehicle faults can be performed quickly in the technical solution of the present application, which does not require that the vehicle must be detected and diagnosed at the maintenance point by the maintenance personnel on site after the vehicle fails, thereby effectively shortening the time for diagnosing vehicle faults and saving labor costs.

Figure 6:
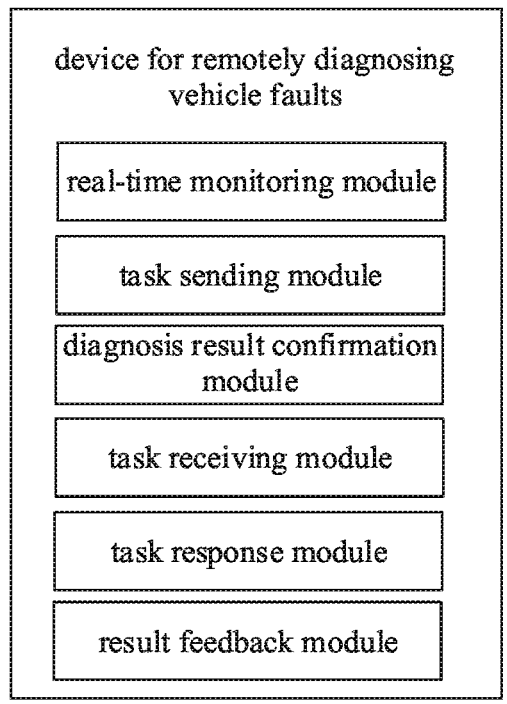
FIG. 6 is a schematic structural diagram of functional modules in the device for remotely diagnosing vehicle faults according to an embodiment of the present application.

In addition, this application also provides a device for remotely diagnosing vehicle faults. As shown in FIG. 6, the device for remotely diagnosing vehicle faults of this application is applied to a cloud platform, and the cloud platform communicates with the vehicle. The device for remotely diagnosing vehicle faults includes a real-time monitoring module, configured to monitor vehicle data uploaded by the vehicle in real time and determine whether to identify a preset fault abnormal signal identification from the target data of the vehicle data; a task sending module, configured to send a fault diagnosis task to the vehicle according to the target data in response to determining that the fault abnormal signal identification is identified from the target data; and a diagnosis result confirmation module, configured to receive diagnosis result data returned by the vehicle after the fault diagnosis task is executed locally and generate a remote fault diagnosis result of the vehicle according to the vehicle data and the diagnosis result data.

The device for remotely diagnosing vehicle faults is further applied to the vehicle, and the device for remotely diagnosing vehicle faults further includes a task receiving module, configured to receive the fault diagnosis task sent from the cloud platform; a task response module, configured to call one or more preset vehicle controllers to execute the fault diagnosis task to obtain diagnosis result data; and a result feedback module, configured to return the diagnosis result data to the cloud platform, to allow the cloud platform to generate a remote fault diagnosis result of the vehicle according to the diagnosis result data and the vehicle data pre-stored in the cloud platform.

In an embodiment, the cloud platform further communicates with the after-sales system of the vehicle, and the device for remotely diagnosing vehicle faults of the present application further includes an after-sales system docking module, configured to send the remote fault diagnosis result to the after-sales system, so that the after-sales system can prepare maintenance services for the vehicle according to the remote fault diagnosis result.

In an embodiment, the cloud platform includes a first cloud database and a second cloud database, and the device for remotely diagnosing vehicle faults of the present application further includes a data storage module, configured to store the vehicle data uploaded by the vehicle in real time in the first cloud database, and store the target data in the second cloud database when the fault abnormal signal identifier is identified from the target data.

In an embodiment, the task sending module is further configured to determine vehicle-related information related to fault abnormal signal data according to the target data stored in the second cloud database, generate a fault diagnosis task for the target vehicle, and send the fault diagnosis task to the target vehicle according to the vehicle-related information. In an embodiment, the diagnosis result confirmation module is further configured to read the target vehicle data of the target vehicle from the vehicle data stored in the first cloud database, and generate a remote fault diagnosis result for the vehicle according to the target vehicle data and the diagnosis result data.

In an embodiment, the task response module is further configured to analyze the fault diagnosis task, send the fault diagnosis task to the corresponding one or more vehicle controllers through the vehicle network, and receive result data returned by one or more vehicle controllers through the vehicle network. The result data is generated by one or more vehicle controllers in response to the fault diagnosis task. The result data is packaged to obtain the diagnosis result data corresponding to the fault diagnosis task.

The specific implementation of the device for remotely diagnosing vehicle faults of the present application is basically the same as the embodiments of the above-mentioned method for remotely diagnosing vehicle faults, which will not be repeated here.

In addition, an embodiment of the present application further provides a vehicle as mentioned in any one of the above embodiments.

Figure 7:
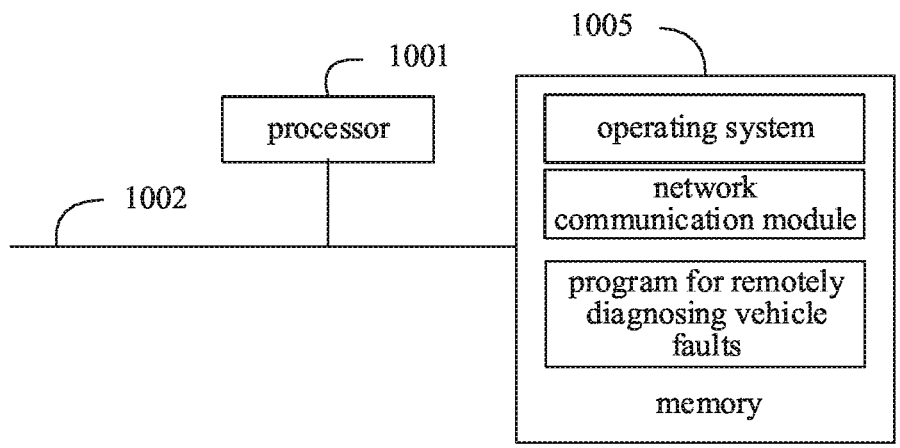
FIG. 7 is a schematic diagram of a device structure under a hardware operating environment in the vehicle according to an embodiment of the present application.

As shown in FIG. 7, FIG. 7 is a schematic diagram of a device structure under a hardware operating environment in the vehicle according to a solution of an embodiment of the present application.

As shown in FIG. 7, the vehicle may include a processor 1001, such as a CPU, a memory 1005, and a communication bus 1002. The communication bus 1002 is used to realize communication between the processor 1001 and the memory 1005. The memory 1005 may be a high-speed RAM memory, or a non-volatile memory, such as a disk memory. In an embodiment, the memory 1005 may also be a storage device independent of the aforementioned processor 1001.

In an embodiment, the vehicle may further include a rectangular user interface, a network interface, a camera, a radio frequency (RF) circuit, a sensor, an audio circuit, a WiFi module, and the like. The rectangular user interface may include a display, an input sub-module such as a keyboard. In an embodiment, the rectangular user interface may also include a standard wired interface and a wireless interface. In an embodiment, the network interface may include a standard wired interface and a wireless interface (such as a WI-FI interface).

Those skilled in the art can understand that the structure shown in FIG. 4 does not constitute a limitation on the vehicle. Based on different design requirements of actual applications, in different feasible implementations, the vehicle can include more or less components than those shown in the figure, or combinations of certain components, or different arrangements of components.

As shown in FIG. 7, the memory 1005 as a storage medium may include an operating system, a network communication module, and a remote fault diagnosis program of the vehicle. The operating system is a program that manages and controls resources based on vehicle hardware and software, and supports the operation of the program for remotely diagnosing vehicle faults, other software and/or programs. The network communication module is used to realize the communication between various components in the memory 1005, and the communication between other hardware and software in the device for remotely diagnosing vehicle faults.

In the vehicle shown in FIG. 7, the processor 1001 is configured to execute the program for remotely diagnosing vehicle faults stored in the memory 1005, to implement the method for remotely diagnosing vehicle faults described in any of the above embodiments.

The specific implementation of the vehicle in the present application is basically the same as the embodiments of the method for remotely diagnosing vehicle faults described above, which will not be repeated here.

In addition, embodiments of the present application further provide a computer storage medium, and the computer storage medium stores one or more programs. The one or more programs can also be executed by one or more processors, to implement the method for remotely diagnosing vehicle faults described in any of the above embodiments.

The specific implementation of the computer storage medium in the present application is basically the same as the embodiments of the method for remotely diagnosing vehicle faults described above, which will not be repeated here.

In addition, the present application further provides a computer program product including a computer program. When the computer program is executed by a processor, the method for remotely diagnosing vehicle faults described above is implemented.

The specific implementation of the computer program product in the present application is basically the same as the embodiments of the method for remotely diagnosing vehicle faults described above, which will not be repeated here. It should be noted that, in the present application, the terms "include", "including" or any other variations thereof are intended to encompass non-exclusive inclusions, so that a process, method, article or device literally including a series of elements includes not only those elements, but also other elements not expressly listed or inherent to such a process, method, article or device. Without further limitation, an element qualified by the phrase "including a . . . " does not preclude the existence of additional identical elements in the process, method, article or device that includes the element.

The above-mentioned serial numbers of the embodiments of the present application are only for description, and do not represent the advantages or disadvantages of the embodiments.

From the description of the above embodiments, those skilled in the art can clearly understand that the methods of the above embodiments can be implemented not only by means of a software plus a necessary general hardware platform, but also by means of a hardware. However, in many cases the former is better. Based on this understanding, the technical solutions of the present application in essence or the parts that make contributions to the prior art can be embodied in the form of software products. The computer software products is stored in a storage medium (such as a read-only memory/random access memory, a magnetic disk or an optical disk, etc.), and includes several instructions to make a terminal device (such as an on-board computer, a smart phone, a computer, a server, an air conditioner, or a network equipment, etc.) execute the methods described in the various embodiments of the present application.

The above are only some embodiments of the present application, and do not limit the scope of the present application thereto. Any equivalent structure transformation or any equivalent process transformation made according to the description and drawings of the present application, or direct/indirect application in other related technical fields are included in the scope of the present application.

The invention claimed is:

1. A method of remotely diagnosing vehicle faults, applied to a cloud platform remotely communicating with a vehicle, the method comprising:
   monitoring, by the cloud platform, vehicle data continuously uploaded by the vehicle in real time;
   determining, by the cloud platform, whether to identify a preset fault abnormal signal identification from target data of the vehicle data;
   in response to the fault abnormal signal identification being identified from the target data, sending, by the cloud platform, a fault diagnosis task to the vehicle according to the target data;
   receiving, by the cloud platform, diagnosis result data returned by the vehicle after the fault diagnosis task is executed locally by the vehicle; and
   generating, by the cloud platform, a remote fault diagnosis result of the vehicle according to the vehicle data and the diagnosis result data.

2. The method according to claim 1, wherein the cloud platform remotely communicates with an after-sales system, the method further comprising:
   after generating the remote fault diagnosis result of the vehicle according to the vehicle data and the diagnosis result data, pushing the remote fault diagnosis result to the after-sales system to allow the after-sales system to prepare a maintenance service for the vehicle according to the remote fault diagnosis result.

3. The method according to claim 1, wherein the cloud platform comprises a first cloud database and a second cloud database, the method further comprising:
   storing the vehicle data uploaded by the vehicle in real time in the first cloud database of the cloud platform; and
   storing the target data in the second cloud database of the cloud platform in response to determining that the fault abnormal signal identification is identified from the target data.

4. The method according to claim 3, wherein the sending the fault diagnosis task to the vehicle according to the target data comprises:
   determining vehicle-related information related to fault abnormal signal data according to the target data stored in the second cloud database;
   generating the fault diagnosis task for the vehicle; and
   sending the fault diagnosis task to the vehicle according to the vehicle-related information.

5. The method according to claim 3, wherein the generating the remote fault diagnosis result of the vehicle according to the vehicle data and the diagnosis result data comprises:
   reading target vehicle data of the vehicle from the vehicle data stored in the first cloud database; and
   generating the remote fault diagnosis result of the vehicle according to the vehicle data and the diagnosis result data.

6. The method according to claim 1, wherein the cloud platform comprises a specific enterprise cloud platform.

7. The method according to claim 1, wherein the cloud platform comprises a general commercial cloud platform.

8. The method according to claim 1, wherein the monitoring, by the cloud platform, the vehicle data continuously uploaded by the vehicle in real time comprises reading, by the cloud platform, the vehicle data using a stream processing framework.

9. The method according to claim 1, further comprising obtaining, by the cloud platform, fault information of the vehicle from the target data in a form of asynchronous transmission query response command interaction using a remote vehicle data collection (RVDC) function.

10. A method of remotely diagnosing vehicle faults, applied to a vehicle remotely communicating with a cloud platform, the method comprising:
    continuously uploading vehicle data generated during operation of the vehicle to the cloud platform;
    receiving a fault diagnosis task sent from the cloud platform, wherein the fault diagnosis task is generated by the cloud platform based on monitoring the vehicle data in real time;
    calling one or more vehicle controllers to execute the fault diagnosis task to obtain diagnosis result data; and
    returning the diagnosis result data to the cloud platform to allow the cloud platform to generate a remote fault diagnosis result of the vehicle according to the diagnosis result data and the vehicle data received by the cloud platform.

11. The method according to claim 10, wherein the calling one or more vehicle controllers to execute the fault diagnosis task to obtain diagnosis result data comprises:
    analyzing the fault diagnosis task;
    sending the fault diagnosis task to the one or more vehicle controllers through a vehicle network;
    receiving result data returned by the one or more vehicle controllers through the vehicle network, wherein the result data is generated when the one or more vehicle controllers respond to the fault diagnosis task; and
    packaging the result data to obtain the diagnosis result data corresponding to the fault diagnosis task.

12. A system of remotely diagnosing vehicle faults, comprising a vehicle and a cloud platform remotely communicating with the vehicle, wherein
    the cloud platform comprises:
      a real-time monitoring module configured to monitor vehicle data continuously uploaded by the vehicle in real time, and determine whether to identify a preset fault abnormal signal identification from target data of the vehicle data;
      a task sending module configured to send a fault diagnosis task to the vehicle according to the target data in response to determining the fault abnormal signal identification being identified from the target data; and
      a diagnosis result confirmation module configured to receive diagnosis result data returned by the vehicle after the fault diagnosis task is executed locally by the vehicle, and generate a remote fault diagnosis result of the vehicle according to the vehicle data and the diagnosis result data; and
    the vehicle comprises:

a task receiving module configured to receive the fault diagnosis task sent from the cloud platform;

a task response module configured to call one or more vehicle controllers to execute the fault diagnosis task to obtain the diagnosis result data; and a result feedback module configured to return the diagnosis result data to the cloud platform to allow the cloud platform to generate the remote fault diagnosis result of the vehicle according to the diagnosis result data and the vehicle data received by the cloud platform.

13. The system according to claim 12, wherein the cloud platform comprises a first cloud database storing the vehicle data, and a second cloud database storing the target data in response to determining that the fault abnormal signal identification is identified from the target data.

14. The system according to claim 13, wherein to send the fault diagnosis task, the task sending module is further configured to:

determine vehicle-related information related to fault abnormal signal data according to the target data stored in the second cloud database;

generate the fault diagnosis task for the vehicle; and send the fault diagnosis task to the vehicle according to the vehicle-related information.

15. The system according to claim 13, wherein to generate a remote fault diagnosis result, the diagnosis result confirmation module is further configured to:

read target vehicle data of the vehicle from the vehicle data stored in the first cloud database; and generate the remote fault diagnosis result of the vehicle according to the vehicle data and the diagnosis result data.

16. The system according to claim 12, wherein to call one or more vehicle controllers, the task response module is further configured to:

analyze the fault diagnosis task;

send the fault diagnosis task to the one or more vehicle controllers through a vehicle network;

receive result data returned by the one or more vehicle controllers through the vehicle network, wherein the result data is generated when the one or more vehicle controllers respond to the fault diagnosis task; and package the result data to obtain the diagnosis result data corresponding to the fault diagnosis task.

17. The system according to claim 12, wherein the task sending module is further configured to send the remote fault diagnosis result to an after-sales system associated with the vehicle to allow the after-sales system to prepare a maintenance service for the vehicle according to the remote fault diagnosis result.

18. The system according to claim 12, wherein the cloud platform comprises a specific enterprise cloud platform.

19. The system according to claim 12, wherein the cloud platform comprises a general commercial cloud platform.

20. The system according to claim 12, wherein to monitor the vehicle data continuously uploaded by the vehicle in real time, the real-time monitoring module is further configured to read the vehicle data using a stream processing framework.

* * * * *